(12) United States Patent
Yazawa

(10) Patent No.: US 10,474,590 B2
(45) Date of Patent: Nov. 12, 2019

(54) STORAGE MEDIUM STORING DEVICE DRIVER, PERIPHERAL DEVICE, AND INFORMATION PROCESSING SYSTEM

(71) Applicant: Roland Corporation, Shizuoka (JP)

(72) Inventor: Ichiro Yazawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 87 days.

(21) Appl. No.: 15/696,190

(22) Filed: Sep. 6, 2017

(65) Prior Publication Data

US 2019/0073322 A1 Mar. 7, 2019

(51) Int. Cl.
| | | |
|---|---|---|
| *G06F 13/10* | (2006.01) | |
| *G06F 3/16* | (2006.01) | |
| *G06F 9/4401* | (2018.01) | |
| *G06F 13/38* | (2006.01) | |

(52) U.S. Cl.
CPC ............ *G06F 13/102* (2013.01); *G06F 3/165* (2013.01); *G06F 9/4411* (2013.01); *G06F 9/4415* (2013.01); *G06F 13/387* (2013.01)

(58) Field of Classification Search
CPC ...... G06F 13/102; G06F 3/165; G06F 9/4411; G06F 13/387
USPC .......................................................... 710/8
See application file for complete search history.

(56) References Cited

U.S. PATENT DOCUMENTS

| | | | | | |
|---|---|---|---|---|---|
| 5,604,843 | A | * | 2/1997 | Shaw ..................... | G06F 3/1296 358/1.1 |
| 5,608,651 | A | * | 3/1997 | Leavy ..................... | H04L 29/06 348/14.12 |
| 5,675,773 | A | * | 10/1997 | Devic ................. | G06F 12/0875 345/522 |
| 6,421,079 | B1 | * | 7/2002 | Truc .................... | H04N 1/00249 348/207.99 |
| 6,480,304 | B1 | * | 11/2002 | Os ...................... | H04N 1/00204 358/442 |
| 6,885,748 | B1 | * | 4/2005 | Wang ..................... | G06F 21/10 380/201 |
| 8,095,715 | B1 | * | 1/2012 | Overby ................. | G06F 13/102 703/25 |
| 8,464,238 | B1 | * | 6/2013 | Chakraborty ....... | H04L 67/1097 709/220 |
| 2002/0174206 | A1 | * | 11/2002 | Moyer ................. | G06F 9/4411 709/221 |

(Continued)

FOREIGN PATENT DOCUMENTS

JP 2013-182243 9/2013

OTHER PUBLICATIONS

Roland Corporation, Reference Manual of "V-Drums TD-50 Drum Sound Module," Sep. 9, 2016, pp. 1-49, available at: https://www.roland.com/us/support/by_product/td-50kv_kd-a22/owners_manuals/83d37af8-3be3-4492-9eb5-8f8dfada66a5/.

*Primary Examiner* — Paul R. Myers
(74) *Attorney, Agent, or Firm* — JCIPRNET

(57) ABSTRACT

A storage medium storing a device driver is a storage medium storing a device driver executed by a computer to control communication between the computer and a peripheral device connected to the computer, and a process for matching a first characteristic and a second characteristic is executed by the device driver, with respect to information transmitted and received between the application software and the peripheral device, on the basis of first information and second information acquired from the peripheral device.

20 Claims, 6 Drawing Sheets

(56) References Cited

U.S. PATENT DOCUMENTS

| | | | | |
|---|---|---|---|---|
| 2003/0184782 | A1* | 10/2003 | Perkins | G06F 3/1204 358/1.13 |
| 2004/0158841 | A1* | 8/2004 | Bochkarev | G06F 9/451 719/321 |
| 2007/0129909 | A1* | 6/2007 | Kusuda | G06F 1/162 702/141 |
| 2007/0142943 | A1* | 6/2007 | Torrini | G11B 20/00086 700/94 |
| 2007/0168062 | A1* | 7/2007 | Torrini | G06F 3/165 700/94 |
| 2008/0158581 | A1* | 7/2008 | Ferlitsch | G06F 3/1206 358/1.13 |
| 2009/0019187 | A1* | 1/2009 | Okuma | H04L 67/327 710/9 |
| 2009/0063710 | A1* | 3/2009 | Sekine | H04N 1/00236 710/1 |
| 2009/0094539 | A1* | 4/2009 | Wang | G06F 13/102 715/762 |
| 2014/0325100 | A1* | 10/2014 | Jung | G06F 13/10 710/72 |
| 2014/0371888 | A1* | 12/2014 | Lundqvist | G10L 19/24 700/94 |
| 2017/0332115 | A1* | 11/2017 | Zhong | H04N 21/23418 |

* cited by examiner

STORAGE MEDIUM STORING DEVICE DRIVER, PERIPHERAL DEVICE, AND INFORMATION PROCESSING SYSTEM

BACKGROUND OF THE INVENTION

Field of the Invention

The present invention relates to a storage medium storing a device driver, a peripheral device, and an information processing system.

Description of Related Art

For example, a peripheral device such as an audio playback device which performs processing such as connecting to a personal computer (hereinafter referred to as a "PC") and playing back music data received from the PC by a connected speaker is known (for example, Japanese Publication No. 2013-182243).

In such a peripheral device, a sampling rate of music data which can be played back varies depending on specifications of hardware such as a digital/analog (D/A) converter mounted in each peripheral device. On the other hand, music data stored in a PC is sampled at various sampling rates. Therefore, for the peripheral device to play back the music data stored in the PC, dedicated processing such as converting the sampling rate of the music data so that the music data can be processed by the peripheral device is additionally required.

In the above-described technology described in Japanese Publication No. 2013-182243, dedicated processing hardware for executing the conversion process is provided in the peripheral device. However, such a peripheral device has a problem in that a cost thereof increases due to the dedicated processing hardware being mounted thereon.

In a case in which a dedicated device driver (a so-called Vendor Driver), in which a unique dedicated process is added to a basic process such as a data transfer process mounted in a standard device driver (a so-called Generic Driver) provided to an operating system (OS) of the PC as standard, can be developed, when a dedicated device driver in which the sampling rate conversion process is mounted as a unique dedicated process is prepared in the device driver, the above-described problem can be solved because it is unnecessary to mount the above-described dedicated processing hardware in the peripheral device.

However, for example, because a sampling rate value of the D/A converter mounted in the peripheral device is a fixed value for the peripheral device, a dedicated device driver in which the value is implemented as a sampling rate conversion value cannot be used for a peripheral device in which a D/A converter having a different sampling rate value is mounted.

That is, even for the same type of peripheral devices (for example, audio playback devices, audio recording devices for storing a signal from a connected microphone, or audio source devices), the same driver cannot be used when specifications of hardware (for example, a digital signal processor such as a D/A converter, an A/D converter, and a audio source circuit) mounted in the peripheral devices are different.

Therefore, each time a developer develops a product, even if the product is the same type of peripheral device as a previously developed peripheral device, the developer has to develop a dedicated driver exclusive to the product and provide the dedicated driver to a user, and the user of the product has to install the dedicated driver exclusive to the product on a PC each time.

The inventor thought that it is desirable for a sampling rate of music data that can be transmitted from a PC to a peripheral device according to specifications of hardware mounted in the peripheral device to be limited, even for the same type of peripheral devices. Therefore, the inventor concluded that it is desirable, for example, for application software on a PC to be allowed to extract music data of a sampling rate permitted to be played back by a connected peripheral device. Although this can be realized when a device driver specific to the model is prepared, the above-described problems still occur.

SUMMARY OF THE INVENTION

One of the embodiments of the present invention provides a storage medium storing a device driver capable of transmitting and receiving information between application software of a computer and a peripheral device having different characteristics.

One of the embodiments of the present invention provides a peripheral device and an information processing system capable of transmitting and receiving information between application software of a computer and the peripheral device by using a device driver.

In one of embodiments of the present invention, a storage medium storing a device driver executed by a computer is stored to control communication between the computer and a peripheral device connected to the computer, stores the device driver configured to cause the computer to function as an acquiring means for acquiring, on a basis of a request from the computer, first information indicating a first characteristic which is a characteristic of information compatible to the peripheral device and second information indicating a second characteristic which is a characteristic of information that is to be made compatible to application software executed by the computer, which are included in predetermined information transmitted from the peripheral device and as a processing means for executing, on a basis of the first information and the second information acquired by the acquiring means, a process for matching the first characteristic and the second characteristic with respect to information transmitted and received between the application software and the peripheral device.

In one of the embodiments of the present invention, by executing the device driver stored in the storage medium in the computer and causing the computer to function as the acquiring means, the first information indicating the first characteristic, which is the characteristic of the information which is compatible to the peripheral device and the second information indicating the second characteristic, which is the characteristic of the information that is to be made compatible to the application software executed by the computer, are acquired by the computer from the predetermined information transmitted from the peripheral device on the basis of a request from the computer. Also, by causing the computer to function as the processing means, the process for obtaining consistency between the first characteristic and the second characteristic with respect to the information transmitted and received between the application software and the peripheral device is executed in the computer on the basis of the first information and the second information acquired by the acquiring means.

In this way, even in a case in which a peripheral device having a different characteristic (first characteristic) of compatible information is connected to the computer or a characteristic (second characteristic) of information to be made compatible to application software is set to be different for each peripheral device connected to the computer, the computer is notified of the information on the characteristics (first information and second information) from the peripheral device side, and the process for matching the first characteristic and the second characteristic with respect to the information transmitted and received between the application software and the peripheral device is executed in the device driver on the basis of the first information and the second information notified of from the peripheral device side. Therefore, even when a peripheral device in which at least one of the first characteristic and the second characteristic is different is connected to the computer, information can be transmitted and received between the application software and the peripheral device by a common device driver. Therefore, the storage medium storing the device driver of the present invention has an advantage that information can be transmitted and received between application software of a computer and a peripheral device having a different characteristic.

In one of the embodiments of the present invention, a peripheral device, which is connectable to a computer, includes a storing means configured to store the first information indicating the first characteristic, which is the characteristic of information compatible to the peripheral device and the second information indicating the second characteristic, which is the characteristic of information that is to be made compatible to an application software executed by the computer, a connecting means configured to connect with the computer, a receiving means configured to receive a request from the computer connected by the connecting means, and a transmitting means configured to transmit the first information and the second information stored in the storing means to the computer when the request from the computer is received by the receiving means.

In this way, the first information indicating the first characteristic which is the characteristic of information which is compatible to the peripheral device and the second information indicating the second characteristic which is the characteristic of information that is to be made compatible to the application software executed by the computer are stored in the storing means. Also, when the request from the computer connected by the connecting means is received by the receiving means, the first information and the second information stored in the storing means are transmitted to the computer by the transmitting means. Therefore, because information indicating a characteristic (first characteristic) of information that is compatible to the peripheral device or a characteristic (second characteristic) of information that is to be made compatible to the application software is directly provided from the peripheral device to the computer, it is unnecessary to prepare a device driver specific to the peripheral device to set the first characteristic and the second characteristic in the computer to which the peripheral device is connected, and thus the device driver can be used in common. That is, by using a device driver capable of transmitting and receiving information between the application software of the computer and a peripheral device having a different characteristic therefrom, information can be transmitted and received between the application software of the computer and the peripheral device.

In one of the embodiments of the present invention, an information processing system includes a computer and a peripheral device connected to the computer, wherein the peripheral device includes a storing means configured to store the first information indicating the first characteristic which is the characteristic of information compatible to the peripheral device and the second information indicating the second characteristic which is the characteristic of information that is to be made compatible to the application software executed by the computer, a receiving means configured to receive a request from the computer, and a transmitting means configured to transmit the first information and the second information stored in the storing means to the computer when the request from the computer is received by the receiving means, the computer includes a requesting means configured to request the receiving means for the first information and the second information stored in the storing means and stores a device driver executed by the computer to control communication between the computer and the peripheral device connected to the computer, and the device driver causes the computer to function as an acquiring means for acquiring the first information and the second information transmitted by the transmitting means on a basis of the request by the requesting means and as a processing means for executing a process for matching the first characteristic and the second characteristic with respect to information transmitted and received between the application software and the peripheral device on a basis of the first information and the second information acquired by the acquiring means.

In this way, in the peripheral device, the first information indicating the first characteristic which is the characteristic of information which is compatible to the peripheral device and the second information indicating the second characteristic which is the characteristic of information that is to be made compatible to the application software executed by the computer are stored in the storing means. Also, when a request by the requesting means of the computer connected to the peripheral device is received by the receiving means, the first information and the second information stored in the storing means are transmitted to the computer by the transmitting means. In the computer, by executing the device driver, the first information and the second information transmitted by the transmitting means are acquired by the acquiring means. Also, by causing the computer to function as the processing means, the process for matching the first characteristic and the second characteristic with respect to the information transmitted and received between the application software and the peripheral device is executed in the computer on the basis of the first information and the second information acquired by the acquiring means.

In this way, even in a case in which a peripheral device having a different characteristic (first characteristic) of compatible information is connected to the computer or a characteristic (second characteristic) of information that is to be made compatible to application software is differently set for each peripheral device connected to the computer, information can be transmitted and received between the application software and the peripheral device by a common device driver. That is, by using a device driver capable of transmitting and receiving information between the application software of the computer and a peripheral device having a different characteristic, information can be transmitted and received between the application software of the computer and the peripheral device.

DESCRIPTION OF THE EMBODIMENTS

Figure 1:
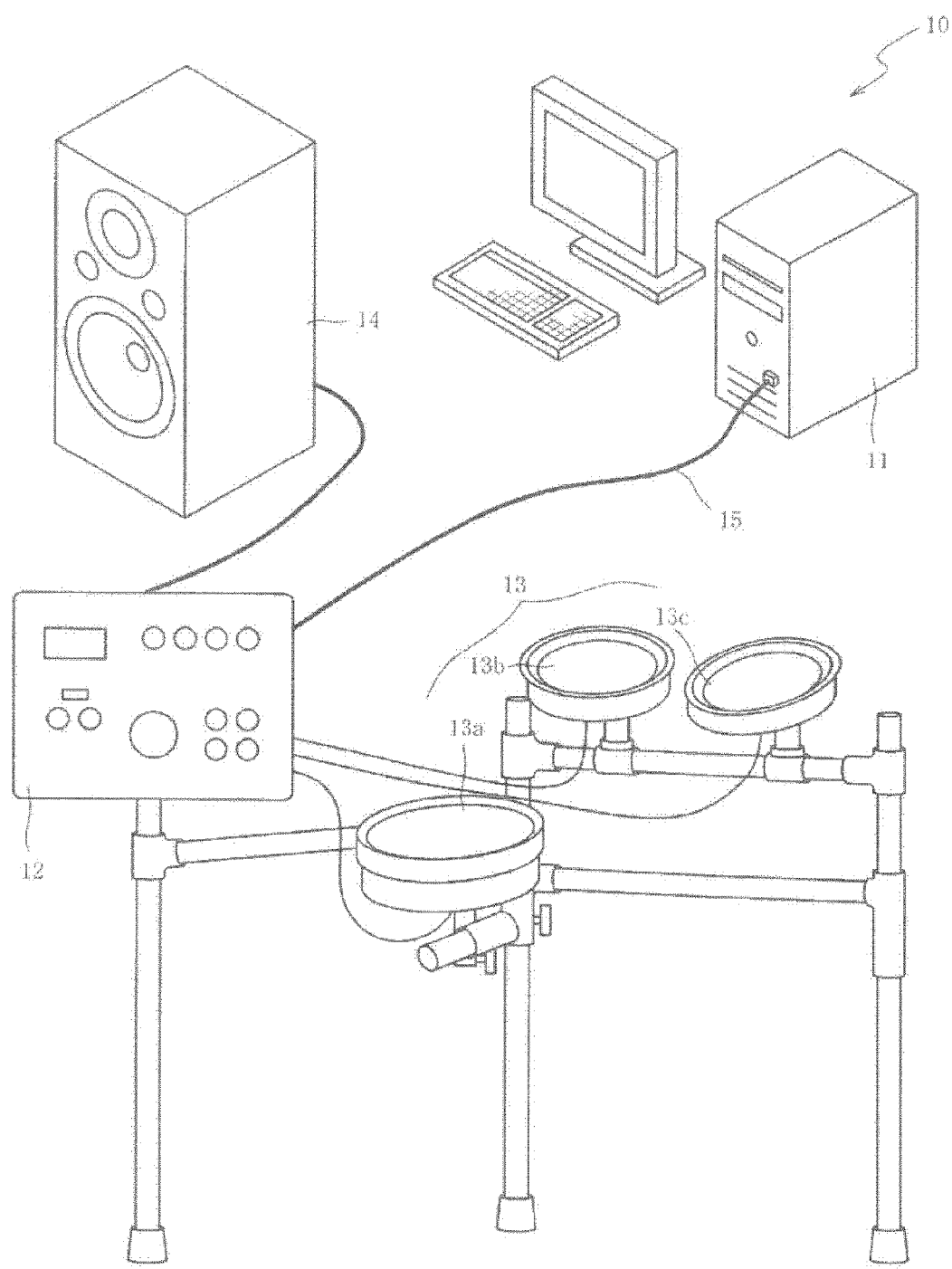
FIG. 1 is a schematic view illustrating an overall image of an electronic drum system according to an embodiment of the present invention.

Hereinafter, embodiments of the present invention will be described with reference to the accompanying drawings. First, an outline of the electronic drum system 10, which is an embodiment of the present invention, will be described with reference to FIG. 1. FIG. 1 is a schematic view illustrating an overall image of the electronic drum system 10.

As illustrated in FIG. 1, the electronic drum system 10 includes a PC 11, an audio source device 12, a plurality of pads 13 (a first pad 13a, a second pad 13b, and a third pad 13c), and a speaker 14. The PC 11, the pads 13, and the speaker 14 are each connected to the audio source device 12. Here, the PC 11 and the audio source device 12 are connected via a USB cable 15 in conformity with the USB standard.

In the electronic drum system 10, by a user hitting each of the pads 13 as if playing an acoustic drum, sound assigned to each of the pads 13 is emitted from the speaker 14 by an electronic process by the audio source device 12. In the electronic drum system 10, the audio source device 12 receives and plays back a music file 23d, which will be described below, stored in the PC 11 and outputs the playback sound from the speaker 14.

The PC 11 is a so-called personal computer, and various processes are executed according to programs installed in the PC 11. The audio source device 12 has audio source data and is a device for generating a signal of sound emitted from the speaker 14 according to sound emission instruction information received from the hit pads 13 or the music file 23d received from the PC 11.

The pads 13 (the first pad 13a, the second pad 13b, and the third pad 13c) are devices for sensing vibration caused by the user hitting the pads and transmitting sound emission instruction information based on the vibration to the audio source device 12. The speaker 14 is a device for emitting sound on the basis of a sound signal generated from the audio source device 12. Although the case in which the first pad 13a to the third pad 13c are connected as the pads 13 is given as an example in this embodiment, the number of the pads 13 to be connected is not limited thereto.

Figure 2:
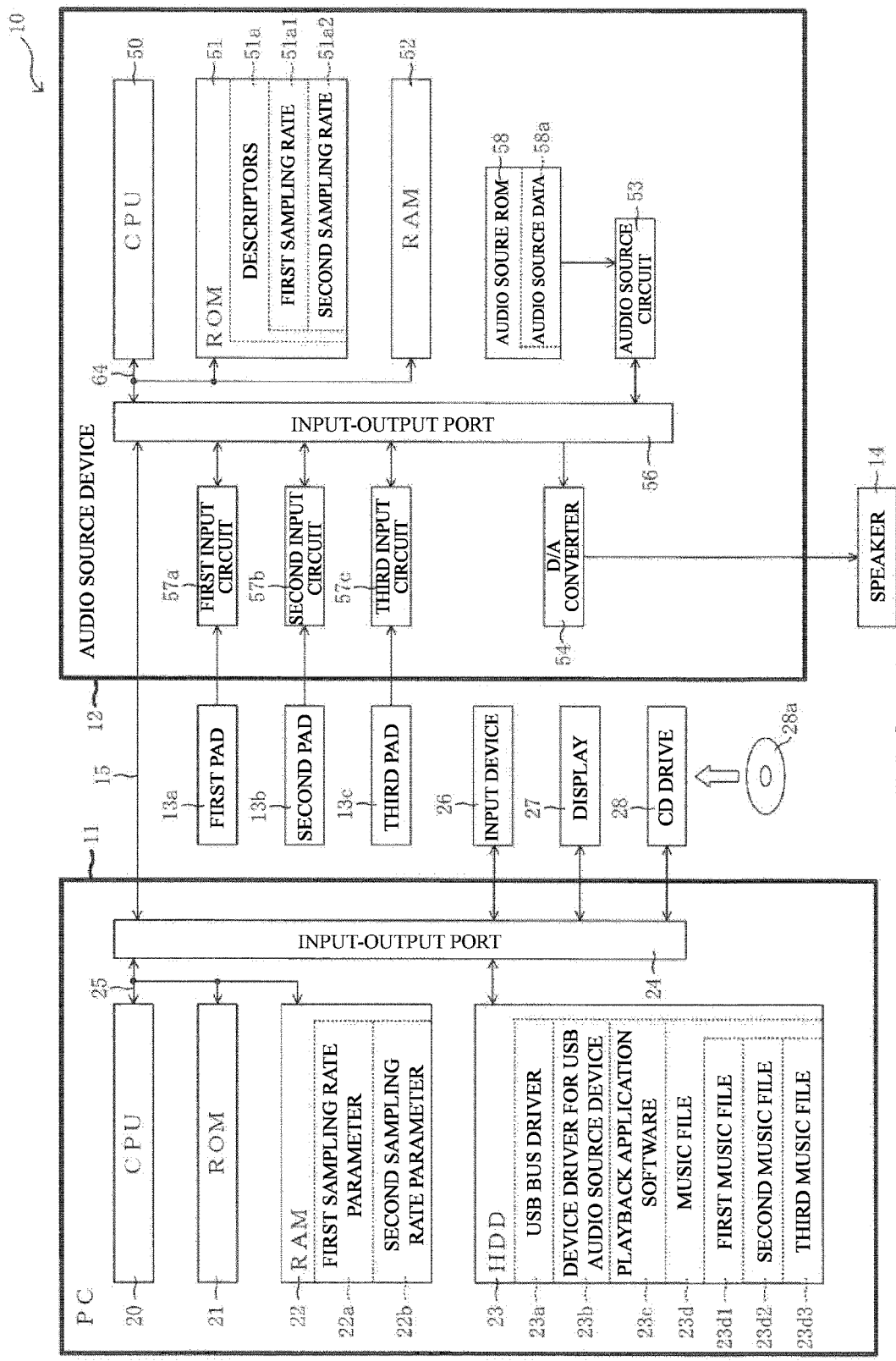
FIG. 2 is a block diagram illustrating an electrical configuration of an electronic drum system 10.

Next, an electrical configuration of the electronic drum system 10 will be described with reference to FIG. 2. FIG. 2 is a block diagram illustrating the electrical configuration of the electronic drum system 10.

First, an electrical configuration of the audio source device 12 will be described. The audio source device 12 includes a central processing unit (CPU) 50, a read only memory (ROM) 51, a random access memory (RAM) 52, an audio source circuit 53, a digital/analog (D/A) converter 54, an input-output port 56, a first input circuit 57a, a second input circuit 57b, a third input circuit 57c, and an audio source ROM 58.

The input-output port 56 is configured such that the USB cable 15 can be inserted thereinto and the PC 11 can be connected thereto via the USB cable 15. The CPU 50, the ROM 51, and the RAM 52 are connected to the input-output port 56 via a bus line 64. Also, the input-output port 56 is connected to the audio source circuit 53, an input side of the D/A converter 54, the first input circuit 57a, the second input circuit 57b, and the third input circuit 57c.

The audio source circuit 53 is connected to the audio source ROM 58. An output side of the D/A converter 54 is connected to the speaker 14. The first input circuit 57a, the second input circuit 57b, and the third input circuit 57c are connected to the first pad 13a, the second pad 13b, and the third pad 13c, respectively.

The CPU 50 is a device for performing various control or arithmetic operation on the basis of a program or fixed value data stored in the ROM 51 and information stored in the RAM 52. The ROM 51 is a non-rewritable nonvolatile memory for storing a program executed in the CPU 50 or fixed value data. The ROM 51 stores, for example, descriptors 51a as the fixed value data.

The descriptors 51a are information for allowing the audio source device 12 to be correctly recognized by the PC 11 when the audio source device 12 is connected to the PC 11 via the USB cable 15. The descriptors 51a are constituted by a device descriptor, a configuration descriptor, an interface descriptor, an end point descriptor, and the like.

The device descriptor is located at the highest position among the descriptors, and ID information (a product ID of a peripheral device, an ID of a manufacturer, and the like) for identifying a peripheral device, the number of configurations, and the like are described therein. The configuration descriptor has information on a configuration of a peripheral device described therein, and specifically, the number of interfaces, power consumption, a power supply method, and the like are described therein.

The interface descriptor has information on specifications of an interface described therein, and specifically, the number of the interface, the number of end points, and the like are described therein. The end point descriptor has information on an end point described therein, and specifically, an end point number, a data transfer mode, a packet size, and the like are described therein.

When any peripheral device is connected to the PC 11 via a USB cable, the PC 11 executes an enumeration process (see FIG. 3) which will be described below and requests the peripheral device connected thereto for transmission of a descriptor. The PC 11 specifies attributes of the connected peripheral device on the basis of a descriptor transmitted from the peripheral device on the basis of the request and activates a device driver compatible to the peripheral device to establish connection between the PC 11 and the peripheral device.

For example, when the audio source device 12 is connected to the PC 11 via the USB cable 15, the descriptors 51*a* are transmitted from the audio source device 12 to the PC 11 according to the request from the PC 11. By the descriptors 51*a*, the PC 11 specifies that the audio source device 12 is connected and establishes connection with the audio source device 12.

The descriptors 51*a* of the audio source device 12 describe a first sampling rate 51*a*1 and a second sampling rate 51*a*2 in the interface descriptor. The first sampling rate 51*a*1 is a conversion frequency for converting a digital signal into an analog signal in the D/A converter 54, and is a sampling rate that is compatible for playback in the audio source device 12. The second sampling rate 51*a*2 is a sampling rate of the music file 23*d* in which the audio source device 12 wishes to make compatible for playback (permit compatibility) using playback application software 23*c* of the PC 11. The second sampling rate 51*a*2 is set to 1 or more (stored in the ROM 51) according to the characterization as a model of the audio source device 12.

The first sampling rate 51*a*1 and the second sampling rate 51*a*2 are included in the descriptors 51*a* and transmitted to the PC 11 when the audio source device 12 is connected to the PC 11. Although details will be described below, the PC 11 uses the first sampling rate 51*a*1 and the second sampling rate 51*a*2 transmitted from the audio source device 12 in a device driver 23*b* for USB audio source device, wherein the device driver 23*b* is executed to control communication between the PC 11 and the audio source device 12.

The RAM 52 is a rewritable volatile memory for temporarily storing various data during execution of various control or arithmetic operation performed in the CPU 50.

The first input circuit 57*a* to the third input circuit 57*c* are interface circuits for connecting to the pads 13. The first input circuit 57*a* is connected to the first pad 13*a*. The second input circuit 57*b* is connected to the second pad 13*b*. The third input circuit 57*c* is connected to the third pad 13*c*.

When sound emission instruction information is transmitted from each of the pads 13, the CPU 50 is notified of the presence of the sound emission instruction information by the first input circuit 57*a* to the third input circuit 57*c* compatible to the pads 13 that transmitted the sound emission instruction information. On the basis of the type of the pad 13 that transmitted the sound emission instruction information (which one of the first pad 13*a* to the third pad 13*c*) and information such as a strength or location of hitting included in the sound emission instruction information, the CPU 50 determines tone color and volume of sound to be emitted and instructs the audio source circuit 53 to emit sound having the determined tone color and volume.

The audio source ROM 58 is an non-rewritable nonvolatile memory for storing audio source data 58*a* used in the audio source circuit 53. The audio source data 58*a* is waveform data of sound required for sound emission compatible to various tone colors and volumes and is digital information sampled at a predetermined sampling rate. The audio source circuit 53 is a circuit that uses the audio source data 58*a* stored in the audio source ROM 58 to generate a digital signal with waveform indicating tone color and volume of sound instructed from the CPU 50 to be emitted by the audio source circuit 53. The D/A converter 54 is a conversion device for converting the digital signal of the waveform to be emitted into an analog sound signal.

The speaker 14 is a device for changing the sound signal transmitted from the D/A converter 54 into physical vibration and emitting sound. That is, on the basis of the sound emission instruction from the CPU 50, sound having tone color and volume indicated in the sound emission instruction is emitted from the speaker 14.

As described above, the audio source device 12 is configured to receive the music file 23*d* from the PC 11 connected thereto and play back the received music file 23*d*. Specifically, when the audio source device 12 receives the music file 23*d* from the PC 11, a digital signal indicating a waveform of the sound is extracted from the music file 23*d* by the CPU 50, and the audio source device 12 inputs the digital signal into the D/A converter 54. After the digital signal is converted into an analog sound signal by the D/A converter 54, the audio source device 12 outputs the music from the speaker 14.

Next, the PC 11 will be described. The PC 11 includes a CPU 20, a ROM 21, a RAM 22, a hard disk drive (HDD) 23, and an input-output port 24. The input-output port 24 is configured such that the USB cable 15 can be inserted thereinto and various peripheral device including the audio source device 12 can be connected thereto via the USB cable 15. The input-output port 24 is connected to the HDD 23, the audio source device 12, an input device 26, a display 27, and a compact disc (CD) drive 28. Also, the CPU 20, the ROM 21, and the RAM 22 are connected to the input-output port 24 via a bus line 25.

The CPU 20 is a device for performing various control or arithmetic operation on the basis of various information such as programs or data stored in the ROM 21, the RAM 22, and the HDD 23. The ROM 21 is an non-rewritable nonvolatile memory in which a boot program executed by the CPU 20 during activation of the PC 11 is stored.

The RAM 22 is a rewritable volatile memory for temporarily storing various data during execution of various control or arithmetic operation performed in the CPU 20. The RAM 22 is configured to store a first sampling rate 22*a* and a second sampling rate 22*b*.

By the audio source device 12 being connected to the PC 11 via the USB cable 15, when the PC 11 executes the enumeration process, the descriptors 51*a* are transmitted from the audio source device 12 to the PC 11 according to a request from the PC 11 as described above. The first sampling rate 51*a*1 and the second sampling rate 51*a*2 included in the descriptors 51*a* are stored in the RAM 22 as the first sampling rate 22*a* and the second sampling rate 22*b*. When executing the device driver 23*b* for USB audio source device to control communication between the PC 11 and the audio source device 12, the PC 11 refers to the first sampling rate 22*a* and the second sampling rate 22*b* stored in the RAM 22.

The HDD 23 is a rewritable nonvolatile storage device for storing programs or data used for various control or arithmetic operation performed in the CPU 20. For example, a USB bus driver 23*a*, device driver 23*b* for the USB audio source device, the playback application software 23*c*, and the music file 23*d* are stored in the HDD 23.

The USB bus driver 23*a* is a driver for recognizing that a peripheral device is connected to the PC 11 via the USB cable 15 and executing the enumeration process. In the enumeration process, the USB bus driver 23*a* specifies attributes of the connected peripheral device and activates a device driver compatible to the peripheral device to establish connection between the PC 11 and the peripheral device. The PC 11 can obtain a descriptor from the peripheral device by the enumeration process.

The device driver 23*b* for USB audio source device is a device driver for controlling communication between the PC 11 and the audio source device 12. For example, when the playback application software 23*c*, which will be described below, executes a process for playing back the music file 23*d* stored in the HDD 23 of the PC 11 on the audio source device 12, the music file 23d is transmitted to the audio source device 12 by control by the device driver 23b for USB audio source device.

Here, in the audio source device 12, when the sampling rate of the music file 23d to be played back is not a sampling rate that is compatible for playback in the audio source device 12, i.e., a sampling rate of the D/A converter 54, the music file 23d cannot be correctly played back. Therefore, the device driver 23b for USB audio source device performs a converting process so that the sampling rate of the music file 23d which is transmitted to the audio source device 12 becomes a sampling rate of the D/A converter 54 of the audio source device 12 (that is, the first sampling rate 51a1). Here, the device driver 23b for USB audio source device determines the sampling rate of the D/A converter 54 of the audio source device 12 with reference to the first sampling rate 22a stored in the RAM 22.

Also, as described above, the audio source device 12 can set a sampling rate (that is, the second sampling rate 51a2) of the music file 23d in which the audio source device 12 wishes to make compatible for playback (permit compatibility) using the playback application software 23c of the PC 11. The device driver 23b for USB audio source device also performs a process of notifying the playback application software 23c of information on the sampling rate of the music file 23d that is desired to be compatible for playback using the playback application software 23c of the PC 11. Here, the device driver 23b for USB audio source device acquires the sampling rate of the music file 23d which is desired to be compatible for playback using the playback application software 23c of the PC 11 with reference to the second sampling rate 22b stored in the RAM 22.

Here, as described above, the first sampling rate 22a and the second sampling rate 22b referred to by the device driver 23b for USB audio source device are the first sampling rate 51a1 and the second sampling rate 51a2 included in the descriptors 51a obtained from the audio source device 12 by the enumeration process. That is, the first sampling rate 22a and the second sampling rate 22b are not directly described in the device driver 23b for USB audio source device and are acquired each time from the audio source device 12 connected to the PC 11. Therefore, even in the case in which the audio source device 12 having a different first sampling rate 51a1 or second sampling rate 51a2 due to a different model and the like is connected to the PC 11, it is unnecessary to prepare the device driver 23b for USB audio source device in which the first sampling rate 51a1 or the second sampling rate 51a2 compatible to the audio source device 12 is described for each audio source device 12, and communication between the PC 11 and the audio source device 12 having a different first sampling rate 51a1 or second sampling rate 51a2 may be possible using a common device driver 23b for USB audio source device.

Also, the device driver 23b for USB audio source device is stored in a storage medium that does not include a transfer medium such as a compact disc-read only memory (CD-ROM) 28a. For example, by inserting the CD-ROM 28a into a CD drive 28 to install the device driver 23b for USB audio source device in the HDD 23, the device driver 23b for USB audio source device can be executed in the PC 11.

The playback application software 23c is application software executed by the CPU 20 to play back the music file 23d stored in the HDD 23 of the PC 11 in the audio source device 12.

Here, the playback application software 23c acquires the sampling rate, that is, the second sampling rate 22b, of the music file 23d in which the audio source device 12 allows to be compatible for playback (permits compatibility) using the playback application software 23c of the PC 11 from the device driver 23b for USB audio source device. Also, the playback application software 23c extracts the music file 23d of the sampling rate indicated by the second sampling rate 22b and presents all of extracted music files 23d on the display 27 to be selectable for the user. In this way, the playback application software 23c may be configured so that only the music file 23d of the second sampling rate 22b that can be played back by the audio source device 12 is selected by the user and played back in the audio source device 12.

Also, when the playback application software 23c acquires a plurality of second sampling rates 22b from the device driver 23b for USB audio source device, the playback application software 23c presents the acquired plurality of second sampling rates 22b on the display 27 to be selectable for the user. When the user selects a single second sampling rate 22b, the playback application software 23c extracts the music file 23d of the second sampling rate 22b selected by the user and presents only the extracted music file 23d to be selectable for the user. In this way, the playback application software 23c may allow only the music file 23d of a sampling rate desired by the user among the plurality of second sampling rates 22b that can be played back by the audio source device 12 to be selected by the user.

The music file 23d is a file in which playing information is stored as music data. In the example illustrated in FIG. 2, three music files 23d of a first music file 23d1, a second music file 23d2, and a third music file 23d3, are stored in the HDD 23. Sampling rates of the three music files 23d are not necessarily equal to each other. For example, the sampling rate of the first music file 23d1 may be 44 kHz, the sampling rate of the second music file 23d2 may be 48 kHz, and the sampling rate of the third music file 23d3 may be 96 kHz. Like this, the three music files 23d may have different sampling rates. The music file 23d may be emitted from the audio source device 12 by the device driver 23b for USB audio source device converting the sampling rate of the music data 23d to be equal to the first sampling rate 51a1.

The display 27 is a display device for displaying results of various control or arithmetic operation executed by the CPU 20 using an image. The input device 26 allows the user to input various information or instructions to the PC 11, and various types such as a keyboard, a mouse, a touch pen, or the like are known.

Figure 3:
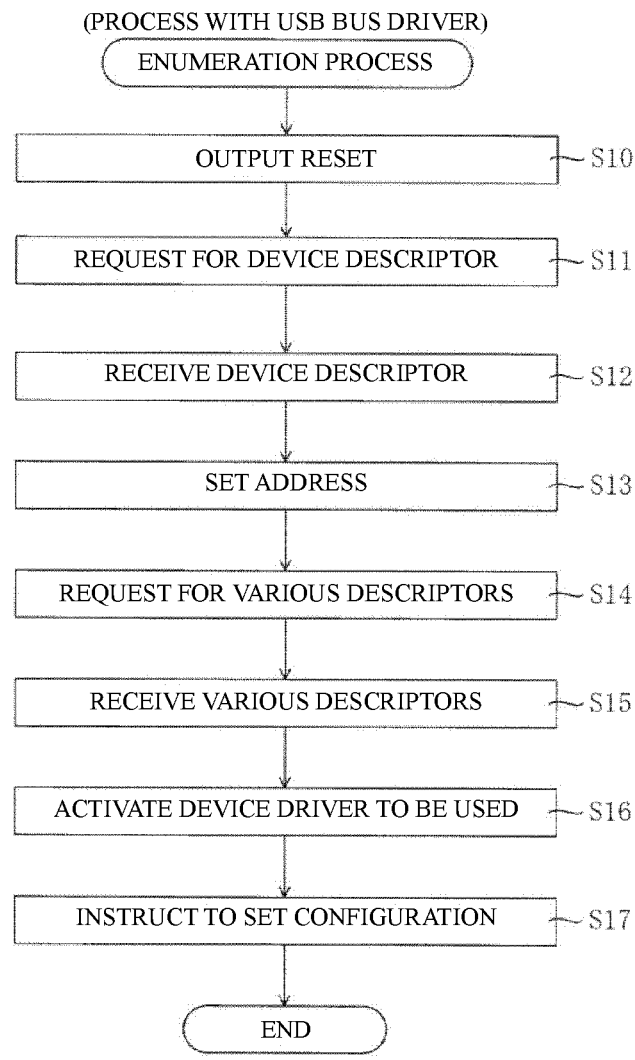
FIG. 3 is a flowchart illustrating an enumeration processing in a universal serial bus (USB) bus driver executed by a PC.

Next, the enumeration process in the USB bus driver 23a executed by the PC 11 will be described using FIG. 3. FIG. 3 is a flowchart illustrating the enumeration process. The enumeration process is a process for specifying attributes of a peripheral device connected to the PC 11 via a USB cable and establishing communication between the PC 11 and the peripheral device. When it is detected that a peripheral device is connected to the PC 11 via a USB cable during activation of the USB bus driver 23a, the PC 11 starts to execute the enumeration process.

In the enumeration process, first, a rest state is output to a connected peripheral device (S10). The peripheral device resets an internal state of the peripheral device on the basis of recognizing the reset state. When the internal state is reset, the peripheral device is in a default state, and control transfer using pipe 0 becomes possible.

Next, in the enumeration process, the connected peripheral device is requested to transmit a device descriptor of the descriptors held by the peripheral device (S11). When the peripheral device receives the request, the peripheral device transmits the device descriptor held by the peripheral device to the PC 11. In the enumeration process, after the process of S11, the device descriptor transmitted from the peripheral device is received (S12). The received device descriptor is stored in the RAM 22.

Next, in the enumeration process, an unused USB address on the USB bus is set for the connected peripheral device (S13). In this way, a specific USB address is assigned to the peripheral device, and then, using the USB address, communication between the PC 11 and the peripheral device is performed.

Next, in the enumeration process, the connected peripheral device is requested to transmit various types of descriptors except for the device descriptor received in the process of S12 (S14). The peripheral device transmits remaining various descriptors held by the peripheral device to the PC 11 on the basis of the request. Also, in the enumeration process, the various descriptors transmitted from the peripheral device on the basis of the request in the process of S14 are received (S15). The various descriptors received here are stored in the RAM 22.

Here, when the peripheral device connected to the PC 11 is the audio source device 12, the first sampling rate 51*a*1 and the second sampling rate 51*a*2 are included in the various descriptors received in the process of S15. Also, the first sampling rate 51*a*1 and the second sampling rate 51*a*2 are stored in the RAM 22 as the first sampling rate 22*a* and the second sampling rate 22*b*, respectively.

Next, in the enumeration process, attributes of the connected peripheral device are specified on the basis of the descriptors received in the processes of S12 and S15, and a device driver compatible to the peripheral device is activated (S16). Also, in the enumeration process, the peripheral device is instructed to set configuration (S17).

By the process of S16, the PC 11 uses the device driver compatible to the peripheral device and enables communication between application software executed in the PC 11 and the peripheral device. Also, by the process of S17, the peripheral device may be set to be a state in which communication with the PC 11 is possible. Therefore, connection between the PC 11 and the peripheral device is established.

Figure 4:
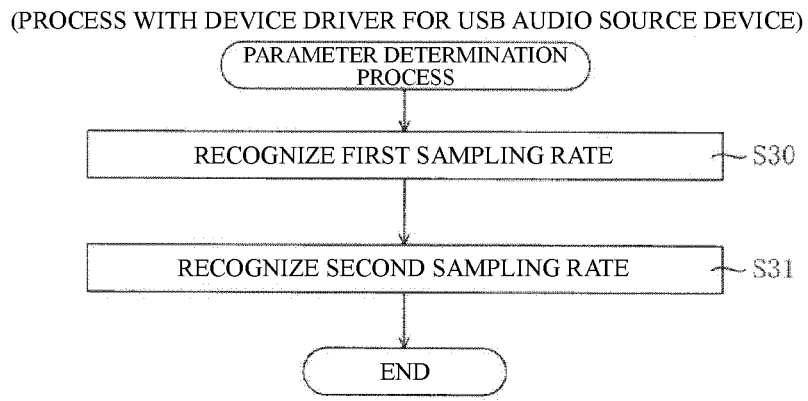
FIG. 4 is a flowchart illustrating a parameter determination process in a device driver for USB audio source device executed by the PC.

Next, a parameter determination process in the device driver 23*b* for USB audio source device executed by the PC 11 will be described with reference to FIG. 4. FIG. 4 is a flowchart illustrating the parameter determination process. The parameter determination process is a process performed as one process of a start process of the device driver 23*b* for USB audio source device when the device driver 23*b* for USB audio source device is activated by the process of S16 of the enumeration process (see FIG. 3).

In the parameter determination process, first, the first sampling rate 22*a* is recognized from the descriptors received from the audio source device 12 and stored in the RAM 22 by the enumeration process (S30). In this way, the device driver 23*b* for USB audio source device can recognize a sampling rate that is compatible for playback in the audio source device 12 (that is, a sampling rate of the D/A converter 54 of the audio source device 12).

Next, in the parameter determination process, the second sampling rate 22*b* is recognized from the descriptors received from the audio source device 12 and stored in the RAM 22 by the enumeration process (S31). In this way, the device driver 23*b* for USB audio source device can recognize a sampling rate of the music file 23*d* in which the audio source device 12 wishes to make compatible for playback (permit compatibility) using the playback application software 23*c* of the PC 11.

In this way, the device driver 23*b* for USB audio source device can recognize the first sampling rate 22*a* and the second sampling rate 22*b* from the descriptors received from the connected audio source device 12 and stored in the RAM 22 by executing the parameter determination process. Also, the device driver 23*b* for USB audio source device can use the parameters to control communication between the playback application software 23*c* executed by the PC 11 and the audio source device 12.

Therefore, even in the case in which the audio source device 12 having a different sampling rate that is compatible for playback in the audio source device 12 (that is, a sampling rate of the D/A converter 54 of the audio source device 12 (the first sampling rate 51*a*1) or a different sampling rate of the music file 23*d* that is desired to be made compatible for playback using the playback application software 23*c* of the PC 11 (the second sampling rate 51*a*2) due to a different model and the like is connected to the PC 11, it is unnecessary to prepare the device driver 23*b* for USB audio source device in which the first sampling rate 51*a*1 or the second sampling rate 51*a*2 compatible to the audio source device 12 is described for each audio source device 12, that is, communication between the PC 11 and the audio source device 12 having a different first sampling rate 51*a*1 or second sampling rate 51*a*2 may be made possible using the common device driver 23*b* for USB audio source device.

Figure 5:
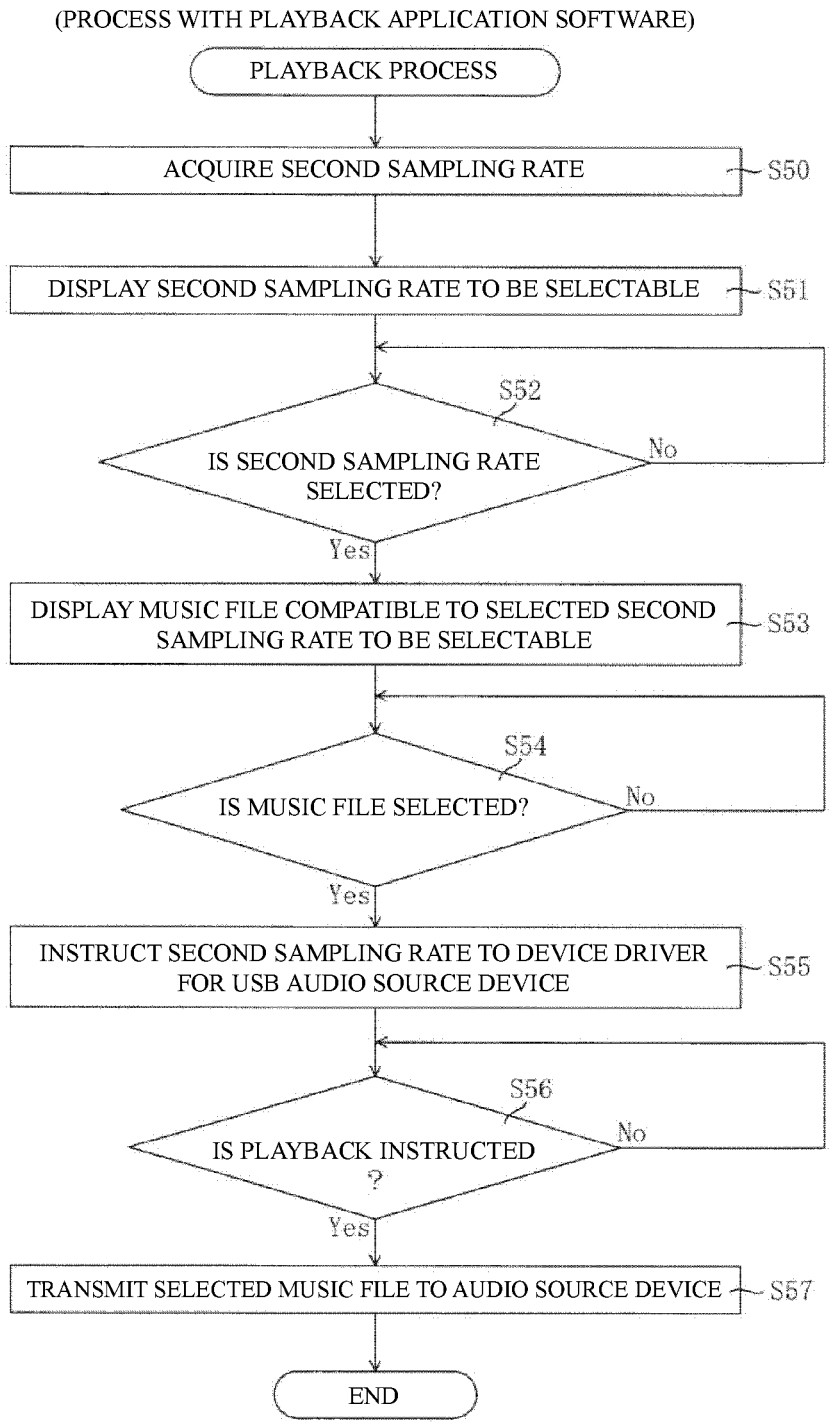
FIG. 5 is a flowchart illustrating a playback process in playback application software executed by the PC.

Next, a playback process in the playback application software 23*c* executed by the PC 11 will be described with reference to FIG. 5. FIG. 5 is a flowchart illustrating the playback process. The playback process is a process for the user to select the music file 23*d* desired to be played back in the audio source device 12 from the music files 23*d* stored in the PC 11 and playing back the selected music file 23*d* in the audio source device 12. The playback process is executed as one process of the playback application software 23*c* when "music file playback" is instructed by the user through the playback application software 23*c* executed in the PC 11.

In the playback process, first, the second sampling rate 22*b* is acquired from the device driver 23*b* for USB audio source device (S50). In this way, the playback application software 23*c* grasps a sampling rate (the second sampling rate 51*a*2) of the music file 23*d* that is desired to be made compatible for playback (permit compatibility) using the playback application software 23*c* in the currently connected audio source device 12.

Next, in the playback process, the second sampling rate 22*b* acquired by the process of S50 is displayed on the display 27 in a format that is selectable for the user (S51). Here, the selectable format is a format such as that in which, when there are a plurality of second sampling rates 22*b* (that is, sampling rates (second sampling rates 51*a*2) which are compatible for playback using the playback application software 23*c* in the currently connected audio source device 12), the user can select a single sampling rate of the plurality of sampling rates. The selection can be made by the user manipulating the input device 26.

In this way, in the currently connected audio source device 12, the plurality of sampling rates (the second sampling rates 51*a*2=the second sampling rates 22*b*) that are compatible for playback using the playback application software 23 are displayed to the user through the display 27, and the user may select a desired sampling rate of the plurality of sampling rates.

Also, in the playback process, whether a single second sampling rate 22*b* is selected by the user among the second sampling rates 22*b* displayed to be selectable for the process of S51 is determined (S52). As a result, when the second sampling rate 22*b* is not determined to be selected (S52: No), the process of S52 is repeatedly executed and it is waited until the second sampling rate 22*b* is selected. Conversely, when it is determined that a single second sampling rate 22*b* is selected by the user as a result of the process of S52 (S52: Yes), the playback process proceeds to a process of S53.

Also, when only one second sampling rate 22*b* is acquired by the process of S50, only the single second sampling rate 22*b* is displayed on the display 27 to be selectable in the process of S51. Also, when the displayed single second sampling rate 22*b* is selected by the user in the process of S52, the playback process proceeds to the process of S53.

However, the embodiments are not necessarily limited thereto, and when only one second sampling rate 22*b* is acquired by the process of S50, the single second sampling rate 22*b* may be displayed on the display 27 in a selected state in the process of S51, and the playback process may proceed to the process of S53 by omitting the process of S52. Also, when only one second sampling rate 22*b* is acquired by the process of S50, the playback process may proceed to the process of S53 by omitting the processes of S51 and S52 and not displaying the acquired second sampling rate 22*b* on the display 27.

In the process of S53, the music file 23*d* of a sampling rate indicated by the selected single second sampling rate 22*b* (when there is only one second sampling rate 22*b*, that second sampling rate 22*b*) is extracted from the HDD 23, and all of the extracted music files 23*d* are displayed on the display 27 in formats selectable for the user (S53). Specifically, attributes such as a filename and a file size of the music file 23*d*, a title of music played using the music file 23*d*, a player's name, a playing time, a sampling rate, and the like are displayed for each of the extracted music files 23*d*, and the music files 23*d* are displayed on the display 27 so that one of the music files 23*d* can be selected by the user.

When only one music file 23*d* is extracted, attributes of only the single music file 23*d* are displayed on the display 27, and the music file 23*d* is displayed on the display 27 so that only the single music file 23*d* can be selected by the user in the process of S53. Also, when a music file 23*d* of a sampling rate indicated by the selected single second sampling rate 22*b* does not exist, the fact state is displayed on the display 27, and the playback process may be ended right away.

Next, in the playback process, whether a single music file 23*d* is selected by the user from the music files 23*d* displayed to be selectable by the process of S53 is determined (S54). As a result, when the music file 23*d* is not determined as selected (S54:No), the process of S54 is repeatedly executed until the music file 23*d* is selected.

Conversely, when it is determined that a single music file 23*d* is selected by the user as a result of the process of S54 (S54:Yes) in the playback process, the second sampling rate 22*b* determined to be selected by the user by the process of S52 is instructed to the device driver 23*b* for USB audio source device (S55).

The second sampling rate 22*b* instructed here is a sampling rate of the single music file 23*d* selected by the user in the process of S54 and is a sampling rate of the music file 23*d* to be played back in the audio source device 12. The device driver 23*b* for USB audio source device uses the second sampling rate 22*b* instructed by the process of S55 and converts the sampling rate of the music file 23*d* into a sampling rate (first sampling rate 22*a*) that is compatible for playback in the audio source device 12.

Next, in the playback process, whether playback is instructed by the user using the input device 26 is determined (S56). As a result, when playback is not determined to be instructed (S56:No), the process of S56 is repeatedly executed until a playback instruction is made. Conversely, when it is determined that playback is instructed by the user as a result of the process of S56 (S56:Yes) in the playback process, the device driver 23*b* for USB audio source device is instructed to transmit the single music file 23*d* selected by the user to the audio source device 12 (S57).

In this way, the device driver 23*b* for USB audio source device transmits the selected single music file 23*d* to the audio source device 12. Here, the device driver 23*b* for USB audio source device converts the sampling rate of the music file 23*d* to be transmitted to the audio source device 12 from the second sampling rate 22*b* into a sampling rate (the first sampling rate 22*a*) that is compatible for playback in the audio source device 12 and transmits the music file 23*d* after the conversion to the audio source device 12.

The playback process ends after the process of S57 is ended.

Figure 6:
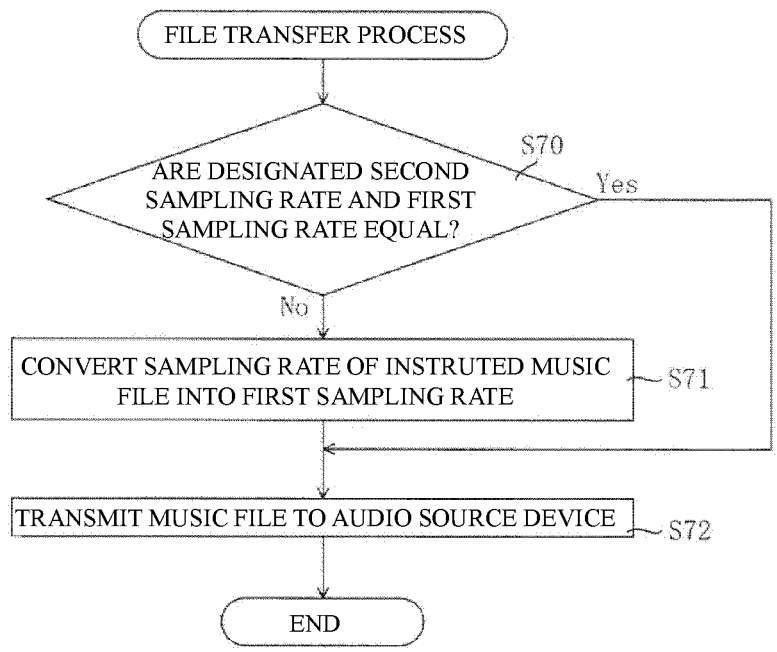
FIG. 6 is a flowchart illustrating a file transfer process in the device driver for USB audio source device executed by the PC.

Next, a file transfer process in the device driver 23*b* for USB audio source device executed by the PC 11 will be described with reference to FIG. 6. FIG. 6 is a flowchart illustrating the file transfer process. The file transfer process is a process for converting a sampling rate of the music file 23*d* that is instructed by the user to be played back from the original sampling rate (the second sampling rate 22*b*) into a sampling rate (the first sampling rate 22*a*) that is compatible for playback in the audio source device 12, and then transmitting the music file 23*d* to the audio source device 12 in the playback process (see FIG. 5) of the playback application software 23*c*. The file transfer process is executed when there is an instruction to play back the music file 23*d* from the playback application software 23*c*.

In the file transfer process, first, whether the second sampling rate 22*b*, which is a sampling rate of the transmitted music file 23*d* instructed by the process of S55 of the playback process of the playback application software 23*c*, and the first sampling rate 22*a*, which is a sampling rate that is compatible for playback in the audio source device 12 (that is, the sampling rate of the D/A converter 54 of the audio source device 12), are equal to each other (S70). As a result, when the second sampling rate 22*b* and the first sampling rate 22*a* are not determined to be equal (S70:No), a process of S71 is executed in the file transfer process.

In the process of S71, the sampling rate of the music file 23*d* to be transmitted to the audio source device 12, which is instructed by the process of S57 of the playback process of the playback application software 23*c*, is converted from the original sampling rate (the second sampling rate 22*b*) into the first sampling rate 22*a*, which is a sampling rate that is compatible for playback in the audio source device 12 (S71).

Also, in the file transfer process, the music file 23*d* whose sampling rate is converted by the process of S71 is transmitted to the audio source device 12 (S72), and the file transfer process ends. Accordingly, in the audio source device 12, music can be played back using the music file 23*d* converted into the first sampling rate 22*a*.

Conversely, when the second sampling rate 22*b*, which is the sampling rate of the transmitted music file 23*d*, and the first sampling rate 22*a*, which is the sampling rate that is compatible for playback in the audio source device 12, are determined to be equal to each other by the process of S70

(S70:Yes), the process of S71 is omitted, and the file transfer process proceeds to a process of S72.

That is, in this case, the music file 23*d* to be transmitted to the audio source device 12 is transmitted to the audio source device 12 with the original sampling rate. Because the original sampling rate is a sampling rate that is compatible for playback in the audio source device 12 (that is, a sampling rate of the D/A converter 54 of the audio source device 12), even when the music file 23*d* is transmitted to the audio source device 12 with the original sampling rate, the music file 23*d* can be played back in the audio source device 12. Also, in this case, because an unnecessary conversion process by the process of S71 can be avoided, it is possible to reduce the processing load on the CPU 20, and deterioration of sound quality of music played back using the music file 23*d* due to the sampling rate conversion can be prevented.

Figure 7:
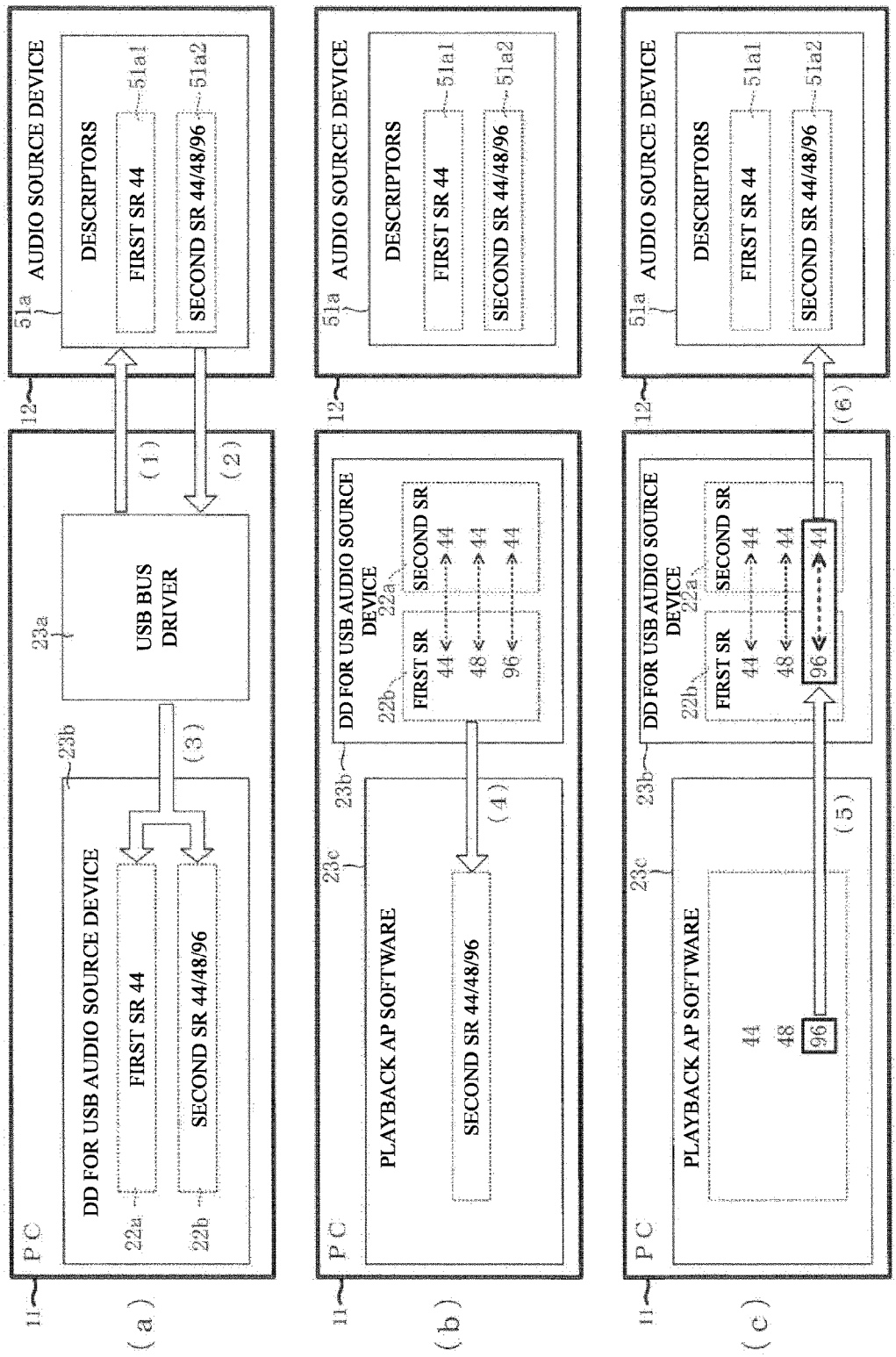
FIG. 7 is a diagram schematically illustrating examples of exchanging of information between the PC and an audio source device, where (a) is a view illustrating a state in which the enumeration process and the parameter determination process are executed by the PC, (b) is a view illustrating a state in which the playback application software acquires a second sampling rate in the playback process executed by the PC, and (c) is a view illustrating a state in which the playback process and the file transfer process are executed by the PC.

Next, a series of flow from the enumeration process to the file transfer process will be described using specific examples with reference to FIG. 7. FIG. 7 is a schematic view illustrating examples of exchanging information between the PC 11 and the audio source device 12, where (a) is a view illustrating a state in which the enumeration process and the parameter determination process are executed by the PC 11, (b) is a view illustrating a state in which the playback application software 23*c* acquires the second sampling rate 22*b* in the playback process executed by the PC 11, and (c) is a view illustrating a state in which the playback process and the file transfer process are executed by the PC 11.

Here, in FIG. 7, the case in which the first sampling rate 51*a*1 included in the descriptors 51*a* of the audio source device 12 connected to the PC 11 is 44 kHz and the second sampling rates 51*a*2 are 44 kHz, 48 kHz, and 96 kHz will be described as an example. That is, it is shown that the sampling rate that is compatible for playback in the audio source device 12 (the sampling rate of the D/A converter 54) is 44 kHz. Also, it is shown that sampling rates of the music file 23*d* that is compatible for playback (permitted for compatibility) using the playback application software 23*c* of the PC 11 in the audio source device 12 are 44 kHz, 48 kHz, and 96 kHz.

First, an exchange of information between the PC 11 and the audio source device 12 from the enumeration process to the parameter determination process will be described with reference to FIG. 7(*a*).

When the audio source device 12 is connected to the PC 11 via the USB cable 15, and the PC 11 executes the enumeration process (FIG. 3) in the USB bus driver 23*a*, as indicated by an arrow (1), the USB bus driver 23*a* requests the audio source device 12 for the descriptors 51*a* (S11, S14 in FIG. 3). In response to the request, as indicated by an arrow (2), the audio source device 12 transmits the descriptors 51*a* including the first sampling rate (marked as "first SR" in FIG. 7) 51*a*1 and the second sampling rate (marked as "second SR" in FIG. 7) 51*a*2 to the PC 11, and the USB bus driver 23*a* receives the descriptors 51*a* (S12, S15 in FIG. 3).

Then, in the PC 11, the device driver 23*b* for USB audio source device (marked as "USB audio source device DD") that controls communication between the PC 11 and the audio source device 12 on the basis of the descriptors 51*a* received by the USB bus driver 23*a* is activated (S16 in FIG. 3). Also, the PC 11 executes the parameter determination process (FIG. 4) in the device driver 23*b* for USB audio source device, and as indicated by an arrow (3), the device driver 23*b* for USB audio source device recognizes each of the first sampling rate 22*a* (44 kHz) and the second sampling rates 22*b* (44 kHz, 48 kHz, and 96 kHz) of the descriptors 51*a* received by the USB bus driver 23*a* (S30, S31 in FIG. 4).

Next, the state in which the playback application software (referred to as "playback AP software" in FIG. 7) 23*c* acquires the second sampling rate 22*b* in the playback process executed by the PC 11 will be described with reference to FIG. 7(*b*). Although the first sampling rate 22*a* and the second sampling rate 22*b* are included in the device driver 23*b* for USB audio source device in FIG. 7(*b*), the first sampling rate 22*a* and the second sampling rate 22*b* are sampling rates recognized in FIG. 7(*a*).

Here, in FIG. 7(*b*), sampling rates recorded in a region of the first sampling rate 22*a* and sampling rates recorded in a region of the second sampling rate 22*b* are schematically connected by arrows of broken lines. Specifically, 44 kHz, 48 kHz, and 96 kHz of the second sampling rates 22*b* are each connected to 44 kHz of the first sampling rate 22*a* by arrows of broken lines. This schematically shows that the second sampling rates 22*b*, 44 kHz, 48 kHz, and 96 kHz, can each be converted into 44 kHz, which is compatible for playback in the audio source device 12.

As indicated by an arrow (4), in the PC 11, the playback process of the playback application software 23*c* acquires the second sampling rates 22*b* from the device driver 23*b* for USB audio source device and recognizes the values (44 kHz, 48 kHz, and 96 kHz) (S50 of FIG. 5).

Next, an exchange of information from the playback process to the file transfer process will be described with reference to FIG. 7(*c*). In FIG. 7(*c*), "44," "48," and "96" which indicate frequencies of the second sampling rates 22*b* are shown in a region of the playback application software 23*c*. This shows that the second sampling rates 22*b* are displayed on the display 27 to be selectable for the user. Among the frequencies, "96" is surrounded by a quadrangular frame, which shows that the user has selected 96 kHz by manipulating the input device 26.

As indicated by an arrow (5), in the playback process of the playback application software 23*c*, when it is determined that the second sampling rate 22*b* is selected by the user (S52:Yes in FIG. 5), the selected second sampling rate 22*b* (96 kHz) is instructed to the device driver 23*b* for USB audio source device (S55 in FIG. 5). Here, the second sampling rate 22*b* which instructed to the device driver 23*b* for USB audio source device is the original sampling rate of the music file 23*d* transmitted from the playback application software 23*c* to the audio source device 12.

Also, in the device driver 23*b* for USB audio source device, when the music file 23*d* is transmitted from the playback application software 23*c* to the audio source device 12, a sampling rate of the music file 23*d* is converted from the second sampling rate 22*b* (96 kHz) selected by the user into the first sampling rate 22*a* (44 kHz), which is a sample rate that is compatible for playback in the audio source device 12 (S71 of FIG. 6). Also, the music file 23*d* after the sampling rate conversion is transmitted to the audio source device 12 as indicated by an arrow (6) (S72 in FIG. 6).

As described above, according to a storage medium storing the device driver 23*b* for USB audio source device, which is an embodiment of the present invention, communication between the PC 11 and the audio source device 12 connected to the PC 11 is controlled by the device driver 23*b* for USB audio source device being installed in the PC 11. For example, the music file 23*d* instructed by the playback application software 23*c* is transmitted to the audio source device 12 by the device driver 23*b* for USB audio source device. Here, the sampling rate of the music file 23d is converted from the original second sampling rate 22b into the first sampling rate 22a that is compatible for playback in the audio source device 12 by the device driver 23b for USB audio source device. The first sampling rate 22a and the second sampling rate 22b are the first sampling rate 51a1 and the second sampling rate 51a2 pre-acquired from the audio source device 12.

In this way, even in the case in which the audio source device 12 in which at least one of the first sampling rate 51a1 that is compatible for playback in the audio source device 12 and the second sampling rate 51a2 that the audio source device 12 wishes to make compatible or playback (permit compatibility) using the playback application software 23c is different is connected to the PC 11, the device driver 23b for USB audio source device does not need to pre-store the first sampling rate 51a1 and the second sampling rate 51a2. Therefore, the PC 11 can convert the sampling rate of the music file 23d to match the first sampling rate 51a1 by the common device driver 23b for USB audio source device.

Further, the audio source device 12 is configured to set a plurality of second sampling rates 51a2, the playback application software 23c displays the plurality of second sampling rates 22b (51a2) on the display 27 to be selectable by the user, makes the user select one of the second sampling rates 22b, and makes the user select the music file 23d having the selected second sampling rate 22b. Then, the device driver 23b for USB audio source device converts the sampling rate of the music file 23d selected by the user from the single second sampling rate 22b selected by the user into the first sampling rate 22a. In this way, the plurality of second sampling rates 51a2 that is compatible for playback using the playback application software 23c and be set by the audio source device 12, and even in the case in which the number of second sampling rates 51a2 to be set is different for each audio source device 12, the different numbers can be compatible to a common device driver 23b for USB audio source device.

Particularly, because various sampling rates are used for the music file 23d, there is great need to vary sampling rates of the music file 23d that is compatible for playback or vary sampling rates of the music files 23d that the audio source device 12 wishes to make compatible for playback using the playback application software 23c for each audio source device 12. Therefore, the above effect can be remarkably achieved in the system in which the music file 23d stored in the PC 11 is played back in the audio source device 12.

Also, according to the audio source device of one embodiment, the first sampling rate 51a1 that is compatible for playback in the audio source device 12 and the second sampling rate 51a2 that the audio source device 12 wishes to make compatible or playback (permit compatibility) using the playback application software 23c are pre-stored in the ROM 51 as some of the descriptors 51a. Also, the first sampling rate 51a1 and the second sampling rate 51a2 are transmitted to the PC 11 in the form of being included in the descriptors 51a on the basis of the request for descriptor from the PC 11. In this way, because the first sampling rate 51a1 and the second sampling rate 51a2 are directly provided to the PC 11, it is unnecessary to prepare a device driver specific to the audio source device 12 for setting the first sampling rate 51a1 and the second sampling rate 51a2 in the PC 11, and communality of the device driver can be achieved.

Further, according to the electronic drum system of one embodiment, it is possible to achieve the same effect as the above-described effect.

Although the present invention has been described above on the basis of embodiments, the present invention is not limited to the above embodiments at all, and it is easy to infer that various modifications are possible within the scope not departing from the gist of the present invention. For example, each of the embodiments may include modified examples which will be described below, and the embodiments may be modified by adding a part or a plurality of parts included in other embodiments or replacing a part or a plurality of parts of the embodiments. Also, the numerical values mentioned in each of the above embodiments are merely examples, and it is obvious that other numerical values can be adopted.

Although an example in which the playback application software 23c is used as application software is described in the above embodiments, the embodiments are not limited thereto. For example, recording application software may also be used. That is, when waveform data that is generated in the audio source device 12 using the audio source data 58a according to hitting information generated by hitting the pads 13 is attempted to be stored in the PC 11 as the music file 23d using recording application software, the device driver 23b for USB audio source device may convert the sampling rate of the music file 23d stored in the PC 11 from the first sampling rate 51a1 that is compatible for recording in the audio source device 12 (a sampling rate of the waveform data generated in the audio source device 12 using the audio source data 58a) into the second sampling rate 51a2 that the audio source device 12 wishes to allow recording (permit compatibility) using the recording application software. Also, the first sampling rate 51a1 and the second sampling rate 51a2 are pre-transmitted from the audio source device 12 to the PC 11, and the device driver 23b for USB audio source device converts the sampling rate of the music file 23d by using the first sampling rate 51a1 (22a) and the second sampling rate 51a2 (22b) pre-acquired from the audio source device 12. In this way, even when the audio source device 12 in which at least one of the first sampling rate 51a1 and the second sampling rate 51a2 is different is connected to the PC 11, the PC 11 may convert the sampling rate of the music file 23d from the first sampling rate 51a1 to the second sampling rate 51a2 by using a common device driver 23b for USB audio source device. That is, the effect of the present invention can be obtained not only by the playback application software 23c but also by the recording application software for storing waveform data generated in the audio source device 12 in the PC 11.

Although the music file 23d in which playing information is stored as music data is used in the above embodiments, the embodiments are not limited thereto. For example, a file in which playing information is stored as a score information file such as a musical instrument digital interface (MIDI) file may also be used. Further, a MIDI format may be used instead of a sampling rate for a parameter that is compatible to the audio source device 12 and a parameter that is allowed to be compatible to application software of the PC 11. In this way, when MIDI files are transmitted and received between the PC 11 and the audio source device 12 and formats that are compatible are different for each of the MIDI files, the format conversion can be performed by the device driver for USB audio source device. Also, even when the audio source device 12 in which a format that is compatible to the audio source device 12 and a format that the audio source device 12 wishes to allow compatibility using application software are different is connected to the PC 11, the format conversion can be performed in a common device driver for USB audio source device.

Although the PC 11 is used as a device for converting a sampling rate of the music file 23*d* to play back the music file 23*d* in the audio source device in the above embodiments, the embodiments are not limited thereto. Any device can be used as long as the device is equipped with an OS, is able to connect to the audio source device 12, and is able to convert the music file 23*d* to have a sampling rate that is executable in the audio source device 12 by using the device driver 23*b* for USB audio source device. For example, portable information terminals such as a smartphone and a tablet terminal may be used, and a universal computer referred to as a host computer may be used.

Although the PC 11 and the audio source device 12 are connected using the USB cable 15 and the audio source device 12 transmits the first sampling rate 51*a*1 and the second sampling rate 51*a*2 to the PC 11 according to a request from the PC 11 by the enumeration process in the above embodiments, the way in which the PC 11 and the audio source device 12 are connected to each other is not limited to the above. For example, the PC 11 and the audio source device 12 may be connected in any way as long as the PC 11 can request the audio source device 12 for settings information of the audio source device 12, and for example, a connection method using a high-definition multimedia interface (HDMI) cable may be used. Further, a timing at which the PC 11 requests the audio source device 12 for the first sampling rate 51*a*1 and the second sampling rate 51*a*2 may be any timing before the music file 23*d* is transmitted from the PC 11 to the audio source device 12. For example, a vendor request by control transfer of a USB standard may be made to the audio source device 12, and transmission of the first sampling rate 51*a*1 and the second sampling rate 51*a*2 may be directly requested.

Although the electronic drum system 10 is used as an example of an electronic instrument system in the above embodiments, the embodiments are not limited thereto. For example, the present invention can also be applied to an electronic instrument system in which an electronic instrument such as an electronic guitar or an electronic piano is connected to the PC 11. Also, the present invention is not limited to being applied to the electronic instrument system, and it is needless to say obvious that the present invention can also be applied to a system in which a peripheral device such as an audio playback device that connects to the speaker 14, receives the music file 23*d* stored in the PC 11, plays back the music file 23*d*, and outputs the played back sound from the speaker 14 or an audio recording device that stores a signal from a microphone connected thereto and transmits the stored information to the PC 11 is connected to the PC 11. That is, when it is desired to set at least one of a characteristic of information that is compatible to a peripheral device (for example, a sampling rate when converting a digital signal into an analog signal in a D/A converter in the case of the audio playback device, and a sampling rate converted using an A/D converter included in the audio recording device in the case of the audio recording device) or a characteristic of information that should be allowed to be compatible to application software of the PC (for example, a sampling rate of the music file 23*d* that is desired to be made compatible for playback using the playback application software 23*c* of the PC 11 in the case of the audio playback device, and a sampling rate that is desired to be made compatible for recording using recording application software of the PC 11 in the case of the audio recording device) be set for each peripheral device, the peripheral device transmits the characteristic of information that is compatible to the peripheral device and the characteristic of information that should be allowed to be compatible to application software of the PC are transmitted to the PC according to a request from the PC. Then, the PC executes a process for matching the characteristic of information that is compatible to the peripheral device and the characteristic of information that should be made compatible to application software of the PC with respect to information transmitted and received between the application software and the peripheral device on the basis of the characteristic of information that is compatible to the peripheral device or the characteristic of information that should be allowed to be compatible to the application software of the PC. The present invention may be a storage medium in which a device driver for executing the above process in the PC is stored. In this way, because it is unnecessary to mount hardware in a peripheral device, the cost can be maintained to be low. Also, because it is unnecessary to prepare a device driver for each peripheral device, the burden on a manufacturer or a user can be reduced.

The number of the first sampling rate 51*a*1, which is a sampling rate that is compatible for playback in the audio source device 12, is not necessarily 1. When the audio source device 12 is compatible to a plurality of sampling rates, there may be a plurality of first sampling rates 51*a*1. In this case, in the process of S70 in the file transfer process, the device driver 23*b* for USB audio source device determines whether any one of the first sampling rates 51*a*1 match a designated second sampling rate 51*a*2. When it is determined that first sampling rates 51*a*1 do not match the designated second sampling rate 51*a*2, the sampling rate of the music file 23*d* may be converted into a maximum value among the first sampling rates 51*a*1 which are lower than the designated second sampling value 51*a*2. In this way, it is unnecessary to drop the sampling rate of the music file 23*d* more than necessary. Therefore, it is possible to prevent sound quality from being lowered more than necessary.

What is claimed is:

1. A storage medium storing a device driver executed by a computer to control communication between the computer and a peripheral device connected to the computer, the storage medium storing the device driver configured to cause the computer to function as:
   an acquiring means for acquiring, in response to a request from the computer during an enumeration between the computer and the peripheral device, first information indicating a first characteristic which is a characteristic of information compatible to the peripheral device and second information indicating a second characteristic which is a characteristic of information to be made compatible to application software executed by the computer, which are included in predetermined information transmitted from the peripheral device; and
   a processing means for executing a process for matching the first characteristic and the second characteristic with respect to information transmitted and received between the application software and the peripheral device on a basis of the first information and the second information acquired by the acquiring means.

2. The storage medium storing the device driver according to claim 1, wherein the predetermined information transmitted from the peripheral device is an interface descriptor.

3. The storage medium storing the device driver according to claim 2, wherein the second characteristic compatible to the application software executed by the computer is a second sampling rate of information serving as an attribute of the peripheral device, and the attribute of the peripheral is able to be identified by the application software executed by the computer.

4. The storage medium storing the device driver according to claim 3, wherein
the peripheral device includes an audio device,
the audio device has a D/A converter or an A/D converter,
the first characteristic is a first sampling rate of information that is compatible to the audio device, and
the first sampling rate is equal to a first conversion frequency when the D/A converter converts a first digital signal into a first analog signal or is equal to a second conversion frequency when the A/D converter converts a second analog signal into a second digital signal.

5. The storage medium storing the device driver according to claim 4, wherein
the application software is playback application software or recording application software, and
the second characteristic is a second sampling rate of information that is to be made compatible to the playback application software or the recording application software.

6. The storage medium storing the device driver according to claim 5, wherein, when the application software is the playback application software, the second sampling rate, which is the second characteristic of the information, is converted into the first sampling rate, which is the first characteristic, and transmitted to the audio device in the process for matching.

7. The storage medium storing the device driver according to claim 5, wherein, when the application software is the recording application software, the first sampling rate, which is the first characteristic of the information, is converted into the second sampling rate, which is the second characteristic, and transmitted to the computer in the process for matching.

8. The storage medium storing the device driver according to claim 3, wherein
the second information is configured to be able to indicate a plurality of second characteristics,
the device driver causes the computer to function as a second information acquiring means that acquires a single second characteristic selected by the application software from the plurality of second characteristics indicated by the second information, and
the processing means executes the process for matching the first characteristic and the single second characteristic with respect to information transmitted and received between the application software and the peripheral device and used in the single second characteristic in the application software on a basis of the single second characteristic acquired by the second information acquiring means and the first information.

9. The storage medium storing the device driver according to claim 8, wherein, when the single second characteristic acquired by the second information acquiring means is in a relationship indicating a same characteristic as the first characteristic indicated by the first information, the processing means is not executed, and the computer performs transmission and reception of information between the application software and the peripheral device.

10. The storage medium storing the device driver according to claim 3, wherein
the information transmitted and received between the application software and the peripheral device is music data,
the first characteristic and the second characteristic are characteristics related to the music data, and
the process executed by the processing means is a process for converting a characteristic of the music data between the first characteristic and the second characteristic.

11. A peripheral device that is able to connect to a computer, the peripheral device comprising:
a storing means configured to store first information indicating a first characteristic, which is a characteristic of information compatible to the peripheral device, and second information indicating a second characteristic which is a characteristic of information that is to be made compatible to an application software executed by the computer;
a connecting means configured to enumerate with the computer;
a receiving means configured to receive a request from the computer in response to an enumeration between the computer and the connecting means; and
a transmitting means configured to transmit the first information and the second information stored in the storing means to the computer when the request from the computer is received by the receiving means.

12. The peripheral device according to claim 11, having a D/A converter or an A/D converter, wherein
the first characteristic is a first sampling rate of information that is compatible to the peripheral device, and
the first sampling rate is equal to a first conversion frequency when the D/A converter converts a first digital signal into a first analog signal or is equal to a second conversion frequency when the A/D converter converts a second analog signal into a second digital signal.

13. The peripheral device according to claim 11, wherein
the information that compatible to the peripheral device is music data, and
the first characteristic and the second characteristic are characteristics related to the music data.

14. The peripheral device according to claim 13, wherein the characteristics related to the music data are sampling rates of the music data or formats of the music data.

15. An information processing system including a computer and a peripheral device connected to the computer, wherein
the peripheral device comprises:
a storing means configured to store first information indicating a first characteristic which is a characteristic of information compatible to the peripheral device and second information indicating a second characteristic which is a characteristic of information that is to be made compatible to the application software executed by the computer;
a receiving means configured to receive a request from the computer in response to an enumeration between the computer and the peripheral device; and
a transmitting means configured to transmit the first information and the second information stored in the storing means to the computer when the request from the computer is received by the receiving means,
the computer comprises:
a requesting means configured to request the receiving means for the first information and the second information stored in the storing means; and
a device driver executed by the computer stored therein to control communication between the computer and the peripheral device connected to the computer, and the device driver causes the computer to function as:
an acquiring means for acquiring the first information and the second information transmitted by the transmitting means on a basis of the request by the requesting means; and
a processing means for executing a process for matching the first characteristic and the second characteristic with respect to information transmitted and received between the application software and the peripheral device on a basis of the first information and the second information acquired by the acquiring means.

16. The information processing system according to claim 15, wherein
the information transmitted and received between the application software and the peripheral device is music data,
the first characteristic and the second characteristic are characteristics related to the music data, and
the process executed by the processing means is a process for converting a characteristic of the music data between the first characteristic and the second characteristic.

17. The information processing system according to claim 16, wherein the first characteristic and the second characteristic are sampling rates of the music data.

18. The information processing system according to claim 16, wherein the first characteristic and the second characteristic are formats of the music data.

19. The information processing system according to claim 17, wherein the converting process includes converting a sampling rate, which is the second characteristic of the music data, into a sampling rate, which is the first characteristic, or converting the sampling rate, which is the first characteristic of the music data, into the sampling rate, which is the second characteristic.

20. The information processing system according to claim 18, wherein the converting process includes converting a format, which is the second characteristic of the music data, into a format, which is the first characteristic or converting the format, which is the first characteristic of the music data, into the format, which is the second characteristic.

* * * * *